United States Patent
Shi et al.

(10) Patent No.: US 10,112,499 B2
(45) Date of Patent: Oct. 30, 2018

(54) SYSTEM AND METHOD FOR CONTROLLING CHARGING AND DISCHARGING OF ELECTRIC VEHICLE

(71) Applicants: State Grid Chongqing Electric Power Co. Electric Power Research Institute, Chongqing (CN); State Grid Corporation of China, Beijing (CN)

(72) Inventors: Lefeng Shi, Chongqing (CN); Zhengfa Liu, Chongqing (CN); Xingzhe Hou, Chongqing (CN); Yongxiang Liu, Chongqing (CN); Lin Gong, Chongqing (CN); Huicai Wang, Chongqing (CN); Zewei Yang, Chongqing (CN)

(73) Assignees: State Grid Chongqing Electric Power Co. Electric Power Research Institute (CN); State Grid Corporation of China (CN)

( * ) Notice: Subject to any disclaimer, the term of this patent is extended or adjusted under 35 U.S.C. 154(b) by 330 days.

(21) Appl. No.: 14/905,282

(22) PCT Filed: Sep. 10, 2014

(86) PCT No.: PCT/CN2014/086224
§ 371 (c)(1),
(2) Date: Jan. 14, 2016

(87) PCT Pub. No.: WO2015/081740
PCT Pub. Date: Jun. 11, 2015

(65) Prior Publication Data
US 2016/0159239 A1    Jun. 9, 2016

(30) Foreign Application Priority Data

Dec. 2, 2013 (CN) .......................... 2013 1 0634900

(51) Int. Cl.
*G05D 3/12*    (2006.01)
*G05D 5/00*    (2006.01)
(Continued)

(52) U.S. Cl.
CPC ....... *B60L 11/1842* (2013.01); *B60L 11/1816* (2013.01); *H02J 3/32* (2013.01);
(Continued)

(58) Field of Classification Search
CPC ............. H02J 3/32; Y02T 10/70; Y04S 30/12
(Continued)

(56) References Cited

U.S. PATENT DOCUMENTS

2007/0282495 A1* 12/2007 Kempton ................. B60L 8/00
701/22
2009/0229900 A1* 9/2009 Hafner ................. B60L 3/0046
180/65.275
(Continued)

FOREIGN PATENT DOCUMENTS

CN        102708425    * 10/2012  ............. G06Q 10/04

*Primary Examiner* — Mohammad Ali
*Assistant Examiner* — Md Azad
(74) *Attorney, Agent, or Firm* — Martine Penilla Group, LLP

(57) ABSTRACT

A method for controlling charging and discharging of an electric vehicle, the method comprising: first, analyzing information such as the battery status and the history default rate of electric vehicles applying for joining a power-grid charging and discharging service, and screening out an electric vehicle that can participate in the charging and discharging service for electric vehicles in the future; then, determining an optimal combination state of a generator set and the electric vehicle by using a method of electric energy transmission cost comparison; and further monitoring in real time the status of the electric vehicle during charging and discharging, and performing real-time power control on the (Continued)

electric vehicle, whereby an electric vehicle aggregator not only can meet the requirements on the charging and discharging service of the power system, but also can implement energy management and real-time control of the electric vehicles during charging and discharging, thereby reducing the effect of charging and discharging on the vehicle-mounted power battery.

6 Claims, 1 Drawing Sheet

(51) Int. Cl.
| | |
|---|---|
| *G05D 11/00* | (2006.01) |
| *G05D 17/00* | (2006.01) |
| *B60L 11/18* | (2006.01) |
| *H02J 3/32* | (2006.01) |
| *H02J 7/00* | (2006.01) |
| *H02J 13/00* | (2006.01) |

(52) U.S. Cl.
CPC ........ *H02J 7/0027* (2013.01); *H02J 13/0079* (2013.01); *Y02B 70/3216* (2013.01); *Y02E 60/721* (2013.01); *Y02E 60/722* (2013.01); *Y02T 10/7055* (2013.01); *Y02T 90/168* (2013.01); *Y04S 10/126* (2013.01); *Y04S 10/14* (2013.01); *Y04S 20/221* (2013.01); *Y04S 30/12* (2013.01)

(58) Field of Classification Search
USPC .......................................................... 700/286
See application file for complete search history.

(56) References Cited

U.S. PATENT DOCUMENTS

| | | | |
|---|---|---|---|
| 2011/0202418 A1* | 8/2011 | Kempton | ............ B60L 11/1824 705/26.1 |
| 2013/0103191 A1* | 4/2013 | Bouman | ............ B60L 11/1816 700/244 |
| 2013/0179061 A1* | 7/2013 | Gadh | ................. B60L 11/1842 701/123 |

* cited by examiner

SYSTEM AND METHOD FOR CONTROLLING CHARGING AND DISCHARGING OF ELECTRIC VEHICLE

CLAIM OF PRIORITY

This application is a Section 371 National Stage Application of International Application No. PCT/CN2014/086224, filed on Sep. 10, 2014, and claiming priority of Chinese Patent Application No. CN201310634900.7, filed on Dec. 2, 2013, the contents of which are incorporated herein by reference.

TECHNICAL FIELD

The present invention pertains to the technical field of smart grid and energy storage and conversion, and more particularly relates to a method and a system for performing control on screening and dispatching of electric vehicles which participate in grid interactive services, in particular to methods applicable to regulation and management of charging and discharging activities, charging and discharging power, and energy transactions of the electric vehicles in conjunction with operation status of the power system after large-scale connection of electric vehicles to the grid.

BACKGROUND ART

Development of electric vehicles has become a trend in future development of the automotive industry and large-scale connection of electric vehicles to the grid will necessarily affect the entire power system such that remote control over charging and discharging activities of numerous distributed electric vehicles becomes an inevitable choice for the power system when dealing with the relation of interests between popularization and regulation of electric vehicles.

The efficient implementation of charging and discharging functions of an electric vehicle deemed as a special mobile energy storage unit via reasonable control of a convertor in a charging facility can largely meet requirements for power frequency modulation, backup services and distributed power source and electrical energy consumption services, etc. in the wide-area power system and is of great significance for improvement of overall electrical energy quality of the power system and cost reduction for electric vehicle holders.

From the perspective of a vehicle-mounted power battery, over-charging and -discharging will both affect the life of the battery while causing a waste of electrical energy of the grid. Therefore, it is necessary to monitor the state of charge of a battery, reasonably distribute the total power demand in the wide-area power system, and to perform dynamic control on charging and discharging of the battery.

Currently available documents only regard electric vehicles as a special type of batteries and perform local control thereon, without considering interaction among a generator set, the grid and electric vehicles in the wide-area power system or taking dynamic matching relations between the charging and discharging and the generator set of electric vehicles into account, and thus they do not conform to actual conditions of the power system and have no strong practicality.

SUMMARY OF THE INVENTION

In view of the above, an object of the present invention is to provide a method and a system for performing control on screening and dispatching of electric vehicles which participate in grid interactive services.

One of objects of the present invention is achieved through such a technical solution: a charging and discharging control system for an electric vehicle, including a total control platform and a detecting module; said total control platform including a communication module, a data storage and management module, a dual-level optimization control module, and a power distribution control module; said communication module for achieving two-way interaction between the total control platform and the electric vehicle, transmitting requirements for a charging and discharging service to a user of the electric vehicle, transmitting the total control platform willingness of the electric vehicle to participate in the charging and discharging service and real-time data about battery status, and performing data transmission and communication with a power control module in a charger; said data storage and management module for storing and managing data related to charging and discharging of the electric vehicle, assigning power command values about charging and discharging of the electric vehicle to related interface variables by protocol to be invoked by the total control platform; said dual-level optimization control module for determining in real time start-stop and power output conditions of a generator set in a wide-area power system, computing in real time decision variables of charging and discharging power of the electric vehicle which participates in a grid charging and discharging service, determining a number of electric vehicles which participate in the charging and discharging service and a real-time charging and discharging power by integrating and analyzing decision variables and data of the generator set; said power distribution control module for controlling the charging and discharging power of the electric vehicle after receiving power control commands from the communication module; and said detecting module for detecting in real time power battery state of the electric vehicle connected to the grid and sending detection data to the total control platform through the communication module.

Another object of the present invention is achieved through the following technical solution: a method for controlling charging and discharging of an electric vehicle, comprising steps of:

Step 1: reading in real time load conditions of each load point in a wide-area power system, analyzing electrical energy demand of the wide-area power system in a next period of time; reading in real time related data of an electric vehicle which is willing to participate in a charging and discharging service of a power system, and storing and managing data through a data storage and management module;

Step 2: determining a total cost of transfer of electrical energy from a generator set i to a wide area network during a period of time t;

Step 3: determining a total cost of participation of an electric vehicle j in the charging and discharging service and screening out a dispatchable electric vehicle aggregator;

Step 4: obtaining a combination of the generator set and the electric vehicle which participates in the charging and discharging service according to Step 2 and Step 3;

Step 5: reading in real time data related to a power battery of the electric vehicle which participates in the charging and discharging service and calculating charging and discharging command values of the electric vehicle which participates in a grid charging and discharging service; and Step 6: storing and then outputting charging and discharging power commands of the electric vehicle which participates in the charging and discharging service.

Furthermore, in Step 1, the related data of the electric vehicle comprises: default rates of an electric vehicle which participated in the charging and discharging service in the past, network topology points where the electric vehicle is connected to the power system, charging and discharging energy demand acceptable to the electric vehicle, rated power of a vehicle-mounted power battery of the electric vehicle, controllable status values, maximum allowable operating power scale values, charge state values, maximum allowable discharging power and maximum allowable charging power, wherein the maximum allowable discharging power and the maximum allowable charging power are both the maximum allowable operating power; when the charging and discharging energy demand of the electric vehicle has a positive value, it indicates that the electric vehicle is willing to participate in a charging service, and at this time said maximum allowable operating power is the maximum allowable charging power; and when the charging and discharging energy demand of the electric vehicle has a negative value, it indicates that the electric vehicle is willing to participate in a discharging service, and at this time said maximum allowable operating power is the maximum allowable charging power.

Furthermore, said Step 2 specifically includes substeps of:

Step 21: measuring whether the generator set i can participate in power dispatching in a future period of time t;

Step 22: determining a fuel cost $C_{fi}^g(p_i(t))$ of the generator set i based on historical data on power generation efficiency and fuel cost of the generator set;

Step 23: determining an emission cost $C_{ei}^g(p_i(t))$ of the generator set i based on historical data on carbon emission factor and carbon emission cost of the generator set;

Step 24: measuring and dispatching network loss of electric quantity $p_i(t)$ during the process of transmission through simulation of transmission from the generator set i to load points of wide area network, further calculating a cost of network loss $C_{li}^g(p_i(t))$;

Step 25: determining a total cost $C_i^g(p_i(t))$ of transmission of electrical energy from the generator set i to wide area network during the period of time t based on the fuel cost, emission cost, and network loss cost of the generator set, the total cost having functions of:

$$C_i^g(p_i(t)) = C_{fi}^g(p_i(t)) + C_{ei}^g(p_i(t)) + C_{li}^g(p_i(t));$$

$$s.t. \begin{cases} p_i(t) \geq p_i^{demand}(t) + p_i^{Network\ loss}(t) \\ p_i^{min} \leq p_i(t) \leq p_i^{max} \end{cases}$$

wherein $p_i(t)$ represents a dispatched electrical quantity when the generator set participates in dispatching of the electrical quantity, $p_i^{min}$ represents a minimum dispatched electrical quantity, $p_i^{max}$ represents a maximum dispatched electrical quantity, $p_i^{demand}(t)$ represents an electrical energy demand of the power system, and $p_i^{network\ loss}(t)$ represents loss of electrical energy from the generator set to load points of the grid during the process of transmission.

Furthermore, said Step 3 specifically includes substeps of:

Step 31: determining whether the electric vehicle j is willing to participate in a charging and discharging service within the period of time t;

Step 32: measuring a voluntary electricity price offered by the electric vehicle which is willing to participate in the charging and discharging service and determining a charging and discharging electrical quantity cost $C_{bj}^v(p_j(t))$ of the electric vehicle;

Step 33: measuring and analyzing a probability $P(E_j)P(Y_t|E_j)$ of possible unexpected events $E_j$ and a resulting consequence $s(Y_t)$ based on historical data when the electric vehicle j participates in the charging and discharging service, further calculating a risk cost $C_{hj}^v(p_j(t))$ resulting from participation of the electric vehicle in the charging and discharging service;

Step 34: measuring network loss of electric quantity during the process of transmission through simulation of participation of the electric vehicle j in the charging and discharging, further calculating a network loss cost $C_{lj}^v(p_j(t))$;

Step 35: determining a total cost $C_j^v(p_j(t))$ caused by participation of the electric vehicle j in the charging and discharging service based on transaction cost, risk cost, and network loss cost of the electric vehicle j participating in the charging and discharging, the cost having functions of:

$$C_j^v(p_j(t)) = C_{bj}^v(p_j(t)) + C_{hj}^v(p_j(t)) + C_{lj}^v(p_j(t));$$

$$s.t. \begin{cases} p_j(t) \geq p_j^{demand}(t) + p_j^{Network\ loss}(t) \\ p_j^{min} \leq p_j(t) \leq p_j^{max} \\ C_{hj}^v = P(E_j)P(Y_t|E_j)s(Y_t) \end{cases},$$

wherein $p_j^{demand}(t)$ is an electrical energy demand for the electric vehicle j by the power system within the period of time t, $p_j^{network\ loss}(t)$ represents loss of electrical energy during the process of transmission when the electric vehicle participates in the charging and discharging, $P(Y_t|E_j)$ is a probability that a consequence $Y_t$ is caused by unexpected events $E_j$, $s(Y_t)$ is a possible loss when the consequence $Y_t$ occurs, $p_j(t)$ represents electrical energy when the electric vehicle j participates in the charging and discharging, $P_j^{min}$ represents a minimum value of electrical energy when the electric vehicle j participates in the charging and discharging, and $P_j^{max}$ represents a maximum value of electrical energy when the electric vehicle j participates in the charging and discharging.

Furthermore, a combination of the generator set and a controllable electric vehicle in Step 4 has a target function of:

$$\min C = \min\left[\sum_{i=1}^{N_s} C_i^g(p_i(t)) + \sum_{K=1}^{K}\sum_{j=1}^{N_s} C_j^v(p_j(t))\right]$$

$$= \min\left[\sum_{i=1}^{N_s}(C_{fi}^g(p_i(t)) + C_{gi}^g(p_i(t)) + C_{li}^g(p_i(t))) + \sum_{K=1}^{K}\sum_{j=1}^{N_s}(C_{bj}^v(p_j(t)) + C_{hj}^v(p_j(t)) + C_{lj}^v(p_j(t)))\right]$$

-continued $$s.t. \begin{cases} \sum_{i=1}^{N_g} p_i(t) + \sum_{j=1}^{N_v} p_j(t) \geq p^{demand}(t) + p^{Network\ loss}(t) \\ p_i^{min} \leq p_i(t) \leq p_i^{max} \\ p_j^{min} \leq p_j(t) \leq p_j^{max} \end{cases}$$

wherein $p^{demand}(t)$ is a total electrical energy demand of the power system within the period of time t, $p^{network\ loss}(t)$ is network loss caused during the process of electrical energy transmission, and thus the sum of $p^{demand}(t)$ and $p^{network\ loss}(t)$ is an actual need for electrical energy by the power system within the period of time t, $C_j^v(p_j(t))$ is a total cost of charging and discharging when the electric vehicle has a charging and discharging power of $p_j(t)$, $p_j(t)>0$ shows charging, $p_j(t)<0$ shows discharging, $p_j(t)=0$ shows no participation in the charging and discharging service, $N_g$ is a number of the generator set in the wide-area power system, K is a set of topological points in the charging and discharging grid for electric vehicles in different areas, and $N_v$ is a number of electric vehicles which have access to a certain topological point.

Furthermore, said Step 5 specifically includes steps of:

Step 51: utilizing the charging and discharging power pj(t) of the electric vehicle within the period of time t, and calculating a power command value of the electric vehicle which participates in the charging and discharging $\gamma_j$ based on a power demand for the electric vehicle aggregator by the power system and dynamic charge status of the vehicle-mounted power battery:

$$\gamma_j = \frac{u_j SOC_j}{\sum_{j=1}^{N_v} u_j SOC_j} \gamma^{Total\ need},$$

in the above equation, $u_j$ is a power percentage value allowing working of the vehicle-mounted power battery of the electric vehicle, the percentage value is read via Step 1, $SOC_j$ is a charge state value of the power battery of the electric vehicle j and this value is read via Step 1; $\gamma^{total\ need}$ is a total power demand for a charging access point of the electric vehicle j by the power system;

Step 52: setting an out-of-limit condition: a node active/reactive unbalance equation, $$\begin{cases} \Delta P_k = P_k - U_k \sum_{b=1}^{n} U_b(G_{kb}\cos\delta_{kb} + B_{kb}\sin\delta_{kb}) \\ \Delta Q_k = Q_k - U_k \sum_{b=1}^{n} U_b(G_{kb}\sin\delta_{kb} - B_{kb}\cos\delta_{kb}) \end{cases} \quad (3)$$

in the above equation (3), $\Delta P_k$ is active unbalance of a node k, $\Delta Q_k$ is reactive unbalance of the node k; $U_k$ is a voltage amplitude of the node k, $U_b$ is a voltage amplitude of a node b, $G_{kb}+jB_{kb}$ is mutual admittance between nodes k and b; $\delta_{kb}$ is a phase-angle difference between nodes k and b; $P_k$ is an injection active power of the node k and $Q_k$ is an injection reactive power of the node k, and they are specifically:

$$\begin{cases} P_k = P_{G,k} - P_{d,k} + N_{dc,k}P_{dc} - N_{c,k}P_c \\ Q_k = Q_{G,k} - Q_{d,k} \end{cases} \quad (4)$$

in the above equation (4), $N_{c,k}$ is a number of a charged electric vehicle at a node k, $N_{dc,k}$ is a number of a discharged electric vehicle at the node k; $P_{d,k}$ is an active load at the node k, $Q_{d,k}$ is a reactive load at the node k; $P_{G,k}$ is an active component of generated power at the node k, $Q_{G,k}$ is a reactive component of generated power at the node k, $P_c$ is an average charging power of the electric vehicle at the node k, and $P_{dc}$ is an average discharging power of the electric vehicle at the node k;

Step 53: judging whether a total charging and discharging power need $\gamma^{total\ need}$ at the node k in Step 51 violates active/reactive unbalance limits based on the above out-of-limit condition; if it violates unbalance limits, then there is a need to adjust the number of charged and discharged electric vehicles and the power thereof and to jump to Step 51 for recounting; and if it does not violate unbalance limits, there is a need to enter Step 54; and Step 54: setting the total charging and discharging power of the electric vehicle at each grid node obtained in Step 53 and charging and discharging power commands of the electric vehicle which participates in the charging and discharging service of the power system determined in Step 51 as final power command values.

By adopting the above technical solutions, the present invention has the following advantages:

The present invention will take the charging and discharging impact of the electric vehicle in the wide-area power system into account, consider its linkage relationship with the generator set and power network, unify the electric vehicle, generator set and power network within a control framework based on a two-level optimization model, and build a method and a system for controlling a wide-area electric vehicle aggregator to achieve a real-time linkage control over the three. The method is easy to implement and master in practical engineering applications; the power system can make the electric vehicle fully play a role as a mobile storage device through the method and control system, thereby achieving safe, stable, economic and green running of the power system. The method comprises: first, analyzing information such as the battery status and the history default rate of electric vehicles applying for joining a power-grid charging and discharging service, and screening out an electric vehicle that can participate in the charging and discharging service for electric vehicles in the future; then, determining an optimal combination state of a generator set and the electric vehicle by using a method of electric energy transmission cost comparison and monitoring in real time a charging and discharging power of the electric vehicle to avoid battery loss caused by overcharging or overdischarging thereof; and further monitoring in real time the status of the electric vehicle during charging and discharging, and performing real-time power control on the electric vehicle, whereby an electric vehicle aggregator not only can meet the requirements on the charging and discharging service of the power system, but also can implement energy management and real-time control of the electric vehicles during charging and discharging, thereby reducing the effect of charging and discharging on the vehicle-mounted power battery.

DESCRIPTION OF DRAWINGS

In order to make the objectives, technical solutions, and advantages of the present invention clearer, the present invention will be described below in further detail with reference to figures, wherein.

DETAILED DESCRIPTION OF EMBODIMENTS

Preferred examples of the present invention will be described below in detail in conjunction with the figures; and it should be understood that the preferred examples are merely illustrative of the present invention and are not intended to limit the scope of the present invention.

Figure 1:
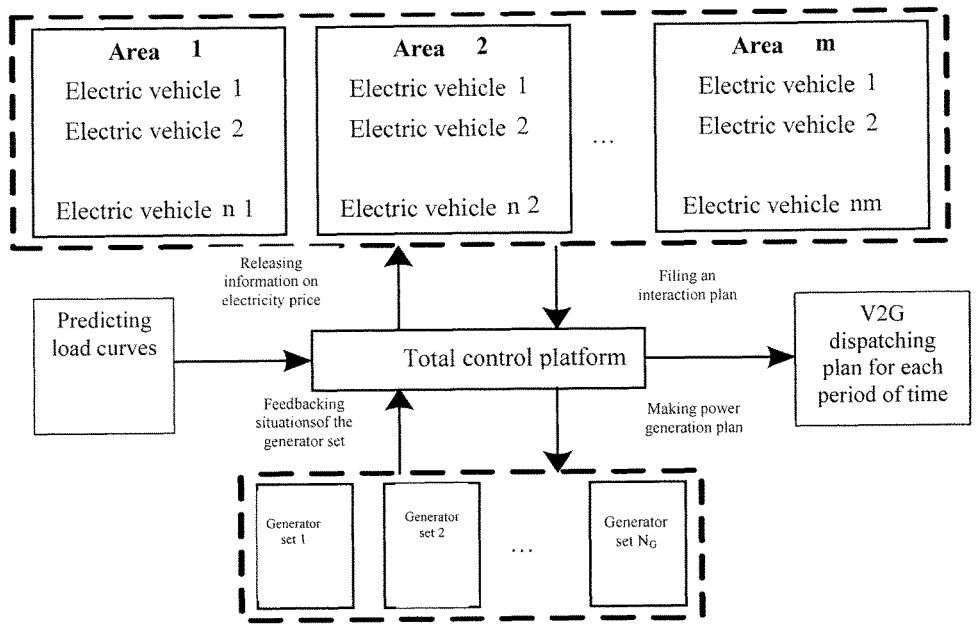
FIG. 1 is a schematic view of interaction between an electric vehicle aggregator and a power system according to the present invention.

As shown in FIG. 1, in the wide-area power system, different nodes are all connected to a certain number of electric vehicles, the electric vehicles are connected to the grid through charging and discharging machine, each charging and discharging machine includes a communication module and a bi-directional converter; two-way interaction between a user of an electric vehicle and a control system can be achieved through the communication module; and the bi-directional converter can execute such functions as switching control and charging and discharging power instructions for the corresponding electric vehicle.

Figure 2:
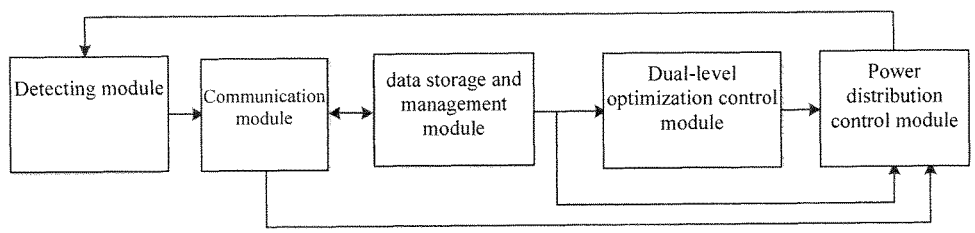
FIG. 2 is an implementation block diagram of a charging and discharging energy management system for the electric vehicle aggregator based on a dual-level optimization strategy according to the present invention.

As shown in FIG. 2, a charging and discharging control system for an electric vehicle includes a total control platform and a detecting module; the total control platform makes a vehicle-to-grid (V2G) dispatching plan for each period of time based on such information as predicted load curves and feedback from a generator set, and performs two-way interaction with the electric vehicle; and said total control platform includes a communication module, a data storage and management module, a dual-level optimization control module, and a power distribution control module.

Said communication module is used for achieving two-way interaction between the total control platform and the electric vehicle, transmitting requirements for a charging and discharging service to a user of the electric vehicle, transmitting the total control platform willingness of the electric vehicle to participate in the charging and discharging service and real-time data about battery status, and performing data transmission and communication with a power control module in a charger.

Said data storage and management module is used for storing and managing data related to charging and discharging of the electric vehicle, assigning power command values about charging and discharging of the electric vehicle to related interface variables by protocol to be invoked by the total control platform. Data managed by and stored in the data storage and management module include data about participation of each electric vehicle in a charging and discharging service, data about controllable status of the electric vehicle which participates in the charging and discharging service, data about power output status of a generator set in a power system, a status signal of each load point in a power network and a signal of power demand for the electric vehicle at each access point by the power system, wherein the above signals are output into a dual-level optimization control module. Data managed by and stored in the data storage and management module also include a battery status signal of the electric vehicle which participates in the charging and discharging service, wherein this signal together with the aforesaid signals is output into the power distribution control module.

Said dual-level optimization control module is used for determining in real time start-stop and power output conditions of a generator set in a wide-area power system, computing in real time decision variables of charging and discharging power of the electric vehicle which participates in a grid charging and discharging service, determining a number of electric vehicles which participate in the charging and discharging service and a real-time charging and discharging power by integrating and analyzing decision variables and data of the generator set.

Said power distribution control module controls the charging and discharging power of the electric vehicle after receiving power control commands from the communication module.

Said detecting module is used for detecting in real time power battery state of the electric vehicle connected to the grid and sending detection data to the total control platform through the communication module.

Based on the above control system, the present invention also provides a method for controlling charging and discharging of an electric vehicle, comprising steps of:

Step 1: reading in real time load conditions of each load point in a wide-area power system, analyzing electrical energy demand of the wide-area power system in a next period of time; reading in real time related data of an electric vehicle which is willing to participate in a charging and discharging service of a power system, and storing and managing data through a data storage and management module, the related data of the electric vehicle comprises: default rates of an electric vehicle which participated in the charging and discharging service in the past, network topology points where the electric vehicle is connected to the power system, charging and discharging energy demand acceptable to the electric vehicle, rated power of a vehicle-mounted power battery of the electric vehicle, controllable status values, maximum allowable operating power scale values, charge state values, maximum allowable discharging power and maximum allowable charging power, wherein the maximum allowable discharging power and the maximum allowable charging power are both the maximum allowable operating power; when the charging and discharging energy demand of the electric vehicle has a positive value, it indicates that the electric vehicle is willing to participate in a charging service, and at this time said maximum allowable operating power is the maximum allowable charging power; and when the charging and discharging energy demand of the electric vehicle has a negative value, it indicates that the electric vehicle is willing to participate in a discharging service, and at this time said maximum allowable operating power is the maximum allowable charging power;

Step 2: determining a total cost of transfer of electrical energy from a generator set i to a wide area network during a period of time t, wherein said Step 2 specifically includes substeps of:

Step 21: measuring whether the generator set i can participate in power dispatching in a future period of time t;

Step 22: determining a fuel cost $C_{fi}^g(p_i(t))$ of the generator set i based on historical data on power generation efficiency and fuel cost of the generator set;

Step 23: determining an emission cost $C_{ei}^g(p_i(t))$ of the generator set i based on historical data on carbon emission factor and carbon emission cost of the generator set;

Step 24: measuring and dispatching network loss of electric quantity $p_i(t)$ during the process of transmission through simulation of transmission from the generator set i to load points of wide area network, further calculating a cost of network loss $C_{li}^g(p_i(t))$;

Step 25: determining a total cost $C_i^g(p_i(t))$ of transmission of electrical energy from the generator set i to wide area network during the period of time t based on the fuel cost, emission cost, and network loss cost of the generator set, the total cost having functions of:

$$C_i^g(p_i(t)) = C_{fi}^g(p_i(t)) + C_{ei}^g(p_i(t)) + C_{li}^g(p_i(t))$$

$$s.t. \begin{cases} p_i(t) \geq p_i^{demand}(t) + p_i^{Network\ loss}(t) \\ p_i^{min} \leq p_i(t) \leq p_i^{max} \end{cases}$$

wherein $p_i(t)$ represents a dispatched electrical quantity when the generator set participates in dispatching of the electrical quantity, $p_i^{min}$ represents a minimum dispatched electrical quantity, $p_i^{max}$ represents a maximum dispatched electrical quantity, $p_i^{demand}(t)$ represents an electrical energy demand of the power system, and $p_i^{network\ loss}(t)$ represents loss of electrical energy from the generator set to load points of the grid during the process of transmission;

Step 3: determining a total cost of participation of an electric vehicle j in the charging and discharging service and screening out a dispatchable electric vehicle aggregator, wherein said Step 3 specifically includes substeps of:

Step 31: determining whether the electric vehicle j is willing to participate in a charging and discharging service within the period of time t;

Step 32: measuring a voluntary electricity price offered by the electric vehicle which is willing to participate in the charging and discharging service and determining a charging and discharging electrical quantity cost $C_{bj}^v(p_j(t))$ of the electric vehicle;

Step 33: measuring and analyzing a probability $P(E_j)P(Y_t|E_j)$ of possible unexpected events $E_j$ and a resulting consequence $s(Y_t)$ based on historical data when the electric vehicle j participates in the charging and discharging service, further calculating a risk cost $C_{hj}^v(p_j(t))$ resulting from participation of the electric vehicle in the charging and discharging service;

Step 34: measuring network loss of electric quantity during the process of transmission through simulation of participation of the electric vehicle j in the charging and discharging, further calculating a network loss cost $C_{lj}^v(p_j(t))$;

Step 35: determining a total cost $C_j^v(p_j(t))$ caused by participation of the electric vehicle j in the charging and discharging service based on transaction cost, risk cost, and network loss cost of the electric vehicle j participating in the charging and discharging, the cost having functions of:

$$C_j^v(p_j(t)) = C_{bj}^v(p_j(t)) + C_{hj}^v(p_j(t)) + C_{lj}^v(p_j(t));$$

$$s.t. \begin{cases} p_j(t) \geq p_j^{demand}(t) + p_j^{Network\ loss}(t) \\ p_j^{min} \leq p_j(t) \leq p_j^{max} \\ C_{hj}^v = P(E_j)P(Y_t|E_j)s(Y_t) \end{cases},$$

wherein $p_j^{demand}(t)$ is an electrical energy demand for the electric vehicle j by the power system within the period of time t, $p_j^{network\ loss}(t)$ represents loss of electrical energy during the process of transmission when the electric vehicle participates in the charging and discharging, $P(Y_t|E_j)$ is a probability that a consequence $Y_t$ is caused by unexpected events $E_j$, $s(Y_t)$ is a possible loss when the consequence $Y_t$ occurs, $P_j^{min}$ represents a minimum value of electrical energy when the electric vehicle j participates in the charging and discharging, and $P_j^{max}$ represents a maximum value of electrical energy when the electric vehicle j participates in the charging and discharging.

Step 4: obtaining a combination of the generator set and the electric vehicle which participates in the charging and discharging service according to Step 2 and Step 3, wherein a combination of the generator set and a controllable electric vehicle in Step 4 has a target function of:

$$\min C = \min\left[\sum_{i=1}^{N_g} C_i^g(p_i(t)) + \sum_{K=1}^{K} \sum_{j=1}^{N_v} C_j^v(p_j(t))\right]$$

$$= \min\begin{bmatrix} \sum_{i=1}^{N_g}(C_{fi}^g(p_i(t)) + C_{gi}^g(p_i(t)) + C_{li}^g(p_i(t))) + \\ \sum_{K=1}^{K} \sum_{j=1}^{N_v}(C_{bj}^v(p_j(t)) + C_{hj}^v(p_j(t)) + C_{lj}^v(p_j(t))) \end{bmatrix}$$

with a proviso:

$$s.t. \begin{cases} \sum_{i=1}^{N_g} p_i(t) + \sum_{j=1}^{N_v} p_j(t) \geq p^{demand}(t) + p^{Network\ loss}(t) \\ p_i^{min} \leq p_i(t) \leq p_i^{max} \\ p_j^{min} \leq p_j(t) \leq p_j^{max} \end{cases}$$

wherein $p^{demand}(t)$ is a total electrical energy demand of the power system within the period of time t, $p^{network\ loss}(t)$ is network loss caused during the process of electrical energy transmission, and thus the sum of $p^{demand}(t)$ and $p^{network\ loss}(t)$ is an actual need for electrical energy by the power system within the period of time t, $C_j^v(p_j(t))$ is a total cost of charging and discharging when the electric vehicle has a charging and discharging power of $p_j(t)$, $p_j(t)>0$ shows charging, $p_j(t)<0$ shows discharging, $p_j(t)=0$ shows no participation in the charging and discharging service, $N_g$ is a number of the generator set in the wide-area power system, K is a set of topological points in the charging and discharging grid for electric vehicles in different areas, and $N_v$ is a number of electric vehicles which have access to a certain topological point.

Step 5: reading in real time data related to a power battery of the electric vehicle which participates in the charging and discharging service and calculating charging and discharging command values of the electric vehicle which participates in a grid charging and discharging service, wherein said Step 5 specifically includes steps of:

Step 51: utilizing the charging and discharging power $p_j(t)$ of the electric vehicle within the period of time t, and calculating a power command value of the electric vehicle which participates in the charging and discharging $\gamma_j$ based on a power demand for the electric vehicle aggregator by the power system and dynamic charge status of the vehicle-mounted power battery:

$$\gamma_j = \frac{u_j SOC_j}{\sum_{j=1}^{N_v} u_j SOC_j} \gamma^{总需求\,Total\,need}$$

in the above equation, $u_j$ is a power percentage value allowing working of the vehicle-mounted power battery of the electric vehicle, the percentage value is read via Step 1, $SOC_j$ is a charge state value of the power battery of the electric vehicle j and this value is read via Step 1; $\gamma^{total\,need}$ is a total power demand for a charging access point of the electric vehicle j by the power system;

Step 52: setting an out-of-limit condition: a node active/reactive unbalance equation, $$\begin{cases} \Delta P_k = P_k - U_k \sum_{b=1}^{n} U_b(G_{kb}\cos\delta_{kb} + B_{kb}\sin\delta_{kb}) \\ \Delta Q_k = Q_k - U_k \sum_{b=1}^{n} U_b(G_{kb}\sin\delta_{kb} - B_{kb}\cos\delta_{kb}) \end{cases} \quad (3)$$

in the above equation (3), $\Delta P_k$ is active unbalance of a node k, $\Delta Q_k$ is reactive unbalance of the node k; $U_k$ is a voltage amplitude of the node k, $U_b$ is a voltage amplitude of a node b, $G_{kb}+jB_{kb}$ is mutual admittance between nodes k and b; $\delta_{kb}$ is a phase-angle difference between nodes k and b; $P_k$ is an injection active power of the node k and $Q_k$ is an injection reactive power of the node k, and they are specifically:

$$\begin{cases} P_k = P_{G,k} - P_{d,k} + N_{dc,k}P_{dc} - N_{c,k}P_c \\ Q_k = Q_{G,k} - Q_{d,k} \end{cases} \quad (4)$$

in the above equation (4), $N_{c,k}$ is a number of a charged electric vehicle at a node k, $N_{dc,k}$ is a number of a discharged electric vehicle at the node k; $P_{d,k}$ is an active load at the node k, $Q_{d,k}$ is a reactive load at the node k; $P_{G,k}$ is an active component of generated power at the node k, $Q_{G,k}$ is a reactive component of generated power at the node k, $P_c$ is an average charging power of the electric vehicle at the node k, and $P_{dc}$ is an average discharging power of the electric vehicle at the node k;

Step 53: judging whether a total charging and discharging power need $\gamma^{total\,need}$ at the node k in Step 51 violates active/reactive unbalance limits based on the above out-of-limit condition; if it violates unbalance limits, then there is a need to adjust the number of charged and discharged electric vehicles and the power thereof and to jump to Step 51 for recounting; and if it does not violate unbalance limits, there is a need to enter Step 54; and Step 54: setting the total charging and discharging power of the electric vehicle at each grid node obtained in Step 53 and charging and discharging power commands of the electric vehicle which participates in the charging and discharging service of the power system determined in Step 51 as final power command values; and Step 6: storing and then outputting charging and discharging power commands of the electric vehicle which participates in the charging and discharging service, wherein in Step 6, after the data storage and management module stores a power command of each electric vehicle which participates in the charging and discharging service, as calculated in Step 5, the power command is output to the power distribution control module via the communication module to execute charging and discharging power control of the electric vehicle and to achieve a function of real-time power control on the vehicle-mounted power battery.

The above technical solutions have advantages of comprehensive consideration, simple calculation, and being easy to implement, etc., and can achieve an optimal combination of power output of a generator set and charging and discharging of an electric vehicle in the wide-area power system and monitor in real time a charging and discharging power of the electric vehicle to avoid battery loss caused by overcharging or over-discharging thereof. Due to first using a dual-level optimization algorithm to select out an electric vehicle that can participate in the charging and discharging service and then distributing the charging and discharging power of the electric vehicle based on restrictive conditions in this invention, security, stability, economy, green and other properties in operation of the power system are greatly improved, thereby achieving a convenient and efficient control over the charging and discharging power of the electric vehicle in the wide-area power system.

The present invention will take the charging and discharging impact of the electric vehicle in the wide-area power system into account, consider its linkage relationship with the generator set and power network, unify the electric vehicle, generator set and power network within a control framework based on a two-level optimization model, and build a method and a system for controlling a wide-area electric vehicle aggregator to achieve a real-time linkage control over the three. The method is easy to implement and master in practical engineering applications; the power system can make the electric vehicle fully play a role as a mobile storage device through the method and control system, thereby achieving safe, stable, economic and green running of the power system. The method comprises: first, analyzing information such as the battery status and the history default rate of electric vehicles applying for joining a power-grid charging and discharging service, and screening out an electric vehicle that can participate in the charging and discharging service for electric vehicles in the future; then, determining an optimal combination state of a generator set and the electric vehicle by using a method of electric energy transmission cost comparison and monitoring in real time a charging and discharging power of the electric vehicle to avoid battery loss caused by overcharging or over-discharging thereof; and further monitoring in real time the status of the electric vehicle during charging and discharging, and performing real-time power control on the electric vehicle, whereby an electric vehicle aggregator not only can meet the requirements on the charging and discharging service of the power system, but also can implement energy management and real-time control of the electric vehicles during charging and discharging, thereby reducing the effect of charging and discharging on the vehicle-mounted power battery.

Provided above are only preferred examples of the present invention which are not intended to limit the present invention, and apparently, those skilled in the art may make various modifications and changes to the present invention without departing from the spirit and scope of the present invention. Accordingly, these modifications and changes to the present invention fall within the scope of the claims of the invention and equivalent techniques thereof, then the present invention will also be intended to encompass these modifications and changes.

What is claimed is:

1. A charging and discharging control system for an electric vehicle, characterized in that it includes a total control platform and a detecting module;
   said total control platform including a communication module, a data storage and management module, a dual-level optimization control module, and a power distribution control module;
   said communication module for achieving two-way interaction between the total control platform and the electric vehicle, transmitting requirements for a charging and discharging service to a user of the electric vehicle, transmitting the total control platform willingness of the electric vehicle to participate in the charging and discharging service and real-time data about battery status, and performing data transmission and communication with a power control module in a charger;
   said data storage and management module for storing and managing data related to charging and discharging of the electric vehicle, assigning power command values about charging and discharging of the electric vehicle to related interface variables by protocol to be invoked by the total control platform;
   said dual-level optimization control module for determining in real time start-stop and power output conditions of a generator set in a wide-area power system, computing in real time decision variables of charging and discharging power of the electric vehicle which participates in a grid charging and discharging service, determining a number of electric vehicles which participate in the charging and discharging service and a real-time charging and discharging power by integrating and analyzing decision variables and data of the generator set;
   said power distribution control module for controlling the charging and discharging power of the electric vehicle after receiving power control commands from the communication module;
   said detecting module for detecting in real time power battery state of the electric vehicle connected to the grid and sending detection data to the total control platform through the communication module;
   wherein the charging and discharging control system for the electric vehicle is used to perform the following steps:

Step 1: reading in real time load conditions of each load point in a wide-area power system, analyzing electrical energy demand of the wide-area power system in a next period of time; reading in real time related data of an electric vehicle which is willing to participate in a charging and discharging service of a power system, and storing and managing data through a data storage and management module;

Step 2: determining a total cost of transfer of electrical energy from a generator set i to a wide area network during a period of time t;

Step 3: determining a total cost of participation of an electric vehicle j in the charging and discharging service and screening out a dispatchable electric vehicle aggregator;

Step 4: obtaining a combination of the generator set and the electric vehicle which participates in the charging and discharging service according to Step 2 and Step 3;

Step 5: reading in real time data related to a power battery of the electric vehicle which participates in the charging and discharging service and calculating charging and discharging command values of the electric vehicle which participates in a grid charging and discharging service; and Step 6: storing and then outputting charging and discharging power commands of the electric vehicle which participates in the charging and discharging service, wherein said Step 2 specifically includes substeps of:

Step 21: monitoring in real time running status of the generator set and measuring whether the generator set i can participate in power dispatching in a future period of time t;

Step 22: determining a fuel cost $C_{fi}^{g}(p_i(t))$ of the generator set i based on historical data on power generation efficiency and fuel cost of the generator set;

Step 23: determining an emission cost $C_{ei}^{g}(p_i(t))$ of the generator set i based on historical data on carbon emission factor and carbon emission cost of the generator set;

Step 24: measuring and dispatching network loss of electric quantity $P_i(t)$ during the process of transmission through simulation of transmission from the generator set i to load points of wide area network, further calculating a cost of network loss $C_{li}^{g}(p_i(t))$;

Step 25: determining a total cost $C_{j}^{g}(P_j(t))$ of transmission of electrical energy from the generator set i to wide area network during the period of time t based on the fuel cost, emission cost, and network loss cost of the generator set, the total cost having functions of:

$$C_i^g(p_i(t)) = C_{fi}^g(p_i(t)) + C_{ei}^g(p_i(t)) + C_{li}^g(p_i(t))$$

$$\text{s.t.} \begin{cases} p_i(t) \geq p_i(t) + p_i(t) \\ p_i^{min} \leq p_i(t) \leq p_i^{max} \end{cases}$$

wherein $p_i(t)$ represents a dispatched electrical quantity when the generator set participates in dispatching of the electrical quantity, $P_i^{min}$ represents a minimum dispatched electrical quantity, $P_i^{max}$ represents a maximum dispatched electrical quantity, $p_i^{demand}(t)$ represents an electrical energy demand of the power system, and $p_i^{network\ loss}(t)$ represents loss of electrical energy from the generator set to load points of the grid during the process of transmission.

2. A method for controlling charging and discharging of an electric vehicle, characterized in that it includes steps of:

Step 1: reading in real time load conditions of each load point in a wide-area power system, analyzing electrical energy demand of the wide-area power system in a next period of time; reading in real time related data of an electric vehicle which is willing to participate in a charging and discharging service of a power system, and storing and managing data through a data storage and management module;

Step 2: determining a total cost of transfer of electrical energy from a generator set i to a wide area network during a period of time t;

Step 3: determining a total cost of participation of an electric vehicle j in the charging and discharging service and screening out a dispatchable electric vehicle aggregator;

Step 4: obtaining a combination of the generator set and the electric vehicle which participates in the charging and discharging service according to Step 2 and Step 3;

Step 5: reading in real time data related to a power battery of the electric vehicle which participates in the charging and discharging service and calculating charging and discharging command values of the electric vehicle which participates in a grid charging and discharging service; and Step 6: storing and then outputting charging and discharging power commands of the electric vehicle which participates in the charging and discharging service, wherein said Step 2 specifically includes substeps of:

Step 21: monitoring in real time running status of the generator set and measuring whether the generator set i can participate in power dispatching in a future period of time t;

Step 22: determining a fuel cost $C_{fi}^g(p_i(t))$ of the generator set i based on historical data on power generation efficiency and fuel cost of the generator set;

Step 23: determining an emission cost $C_{ei}^g(p_i(t))$ of the generator set i based on historical data on carbon emission factor and carbon emission cost of the generator set;

Step 24: measuring and dispatching network loss of electric quantity $P_i(t)$ during the process of transmission through simulation of transmission from the generator set i to load points of wide area network, further calculating a cost of network loss $C_{li}^g(p_i(t))$;

Step 25: determining a total cost $C_j^g(p_j(t))$ of transmission of electrical energy from the generator set i to wide area network during the period of time t based on the fuel cost, emission cost, and network loss cost of the generator set, the total cost having functions of:

$$C_i^g(p_i(t)) = C_{fi}^g(p_i(t)) + C_{ei}^g(p_i(t)) + C_{li}^g(p_i(t))$$

$$s.t. \begin{cases} p_i(t) \geq p_i(t) + p_i(t) \\ p_i^{min} \leq p_i(t) \leq p_i^{max} \end{cases}$$

wherein $p_i(t)$ represents a dispatched electrical quantity when the generator set participates in dispatching of the electrical quantity, $p_i^{min}$ represents a minimum dispatched electrical quantity, $p_i^{max}$ represents a maximum dispatched electrical quantity, $p_i^{demand}(t)$ represents an electrical energy demand of the power system, and $p_i^{network\ loss}(t)$ represents loss of electrical energy from the generator set to load points of the grid during the process of transmission.

3. The method for controlling charging and discharging of an electric vehicle as recited in claim 2, characterized in that in Step 1, the related data of the electric vehicle comprises: default rates of an electric vehicle which participated in the charging and discharging service in the past, network topology points where the electric vehicle is connected to the power system, charging and discharging energy demand acceptable to the electric vehicle, rated power of a vehicle-mounted power battery of the electric vehicle, controllable status values, maximum allowable operating power scale values, charge state values, maximum allowable discharging power and maximum allowable charging power, wherein the maximum allowable discharging power and the maximum allowable charging power are both the maximum allowable operating power; when the charging and discharging energy demand of the electric vehicle has a positive value, it indicates that the electric vehicle is willing to participate in a charging service, and at this time said maximum allowable operating power is the maximum allowable charging power; and when the charging and discharging energy demand of the electric vehicle has a negative value, it indicates that the electric vehicle is willing to participate in a discharging service, and at this time said maximum allowable operating power is the maximum allowable charging power.

4. The method for controlling charging and discharging of an electric vehicle as recited in claim 2, characterized in that said Step 3 specifically includes substeps of:

Step 31: determining whether the electric vehicle j is willing to participate in a charging and discharging service within the period of time t according to an application for the charging and discharging service when the electric vehicle is connected to the grid;

Step 32: measuring a voluntary electricity price offered by the electric vehicle which is willing to participate in the charging and discharging service and determining a charging and discharging electrical quantity cost $C_{bj}^v(p_j(t))$ of the electric vehicle;

Step 33: measuring and analyzing a probability $P(E_j)P(Y_t|E_j)$ of possible unexpected events $E_j$ and a resulting consequence $s(Y_t)$ based on historical data when the electric vehicle j participates in the charging and discharging service, further calculating a risk cost $C_{hj}^v(p_j(t))$ resulting from participation of the electric vehicle in the charging and discharging service;

Step 34: measuring network loss of electric quantity during the process of transmission through simulation of participation of the electric vehicle j in the charging and discharging, further calculating a network loss cost $C_{lj}^v(p_j(t))$;

Step 35: determining a total cost $C_j^v(p_j(t))$ caused by participation of the electric vehicle j in the charging and discharging service based on transaction cost, risk cost, and network loss cost of the electric vehicle j participating in the charging and discharging, the cost having functions of:

$$C_j^v(p_j(t)) = C_{bj}^v(p_j(t)) + C_{hj}^v(p_j(t)) + C_{lj}^v(p_j(t));$$

$$s.t. \begin{cases} p_j(t) \geq p_j(t) + p_j(t) \\ p_j^{min} \leq p_j(t) \leq p_j^{max} \\ C_{hj}^v = P(E_j)P(Y_t|E_j)s(Y_t) \end{cases},$$

wherein $p_i^{demand}(t)$ is an electrical energy demand for the electric vehicle j by the power system within the period of time t, $p_i^{network\ loss}(t)$ represents loss of electrical energy during the process of transmission when the electric vehicle participates in the charging and discharging, $P(Y_t|E_j)$ is a probability that a consequence $Y_t$ is caused by unexpected events $E_j$, $s(Y_t)$ is a possible loss when the consequence $Y_t$ occurs, $p_j(t)$ represents electrical energy when the electric vehicle j participates in the charging and discharging, $P_j^{min}$ represents a minimum value of electrical energy when the electric vehicle j participates in the charging and discharging, and $P_j^{max}$ represents a maximum value of electrical energy when the electric vehicle j participates in the charging and discharging.

5. The method for controlling charging and discharging of an electric vehicle as recited in claim 2, characterized in that a combination of the generator set and a controllable electric vehicle in Step 4 has a target function of:

$$\min C = \min\left[\sum_{i=1}^{N_g} C_i^g(p_i(t)) + \sum_{K=1}^{K}\sum_{j=1}^{N_v} C_j^v(p_j(t))\right]$$

$$= \min\begin{bmatrix} \sum_{i=1}^{N_g} (C_{fi}^g(p_i(t)) + C_{gi}^g(p_i(t)) + C_{li}^g(p_i(t))) + \\ \sum_{K=1}^{K}\sum_{j=1}^{N_v} (C_{bj}^v(p_j(t)) + C_{hj}^v(p_j(t)) + C_{li}^v(p_j(t))) \end{bmatrix}$$

with a proviso:

$$s.t.\begin{cases} \sum_{i=1}^{N_g} p_i(t) + \sum_{j=1}^{N_v} p_j(t) \geq p(t) + p(t) \\ p_i^{min} \leq p_i(t) \leq p_i^{max} \\ p_j^{min} \leq p_j(t) \leq p_j^{max} \end{cases}$$

wherein $p^{demand}(t)$ is a total electrical energy demand of the power system within the period of time t, $p^{network\ loss}(t)$ is network loss caused during the process of electrical energy transmission, and thus the sum of $p^{demand}(t)$ and $p^{network\ loss}(t)$ is an actual need for electrical energy by the power system within the period of time t, $C_j^v(p_j(t))$ is a total cost of charging and discharging when the electric vehicle has a charging and discharging power of $p_j(t)$, $p_j(t)>0$ shows charging, $p_j(t)<0$ shows discharging, $p_j(t)=0$ shows no participation in the charging and discharging service, $N_g$ is a number of the generator set in the wide-area power system, K is a set of topological points in the charging and discharging grid for electric vehicles in different areas, and, $N_v$ is a number of electric vehicles which have access to a certain topological point.

6. The method for controlling charging and discharging of an electric vehicle as recited in claim 2, characterized in that said Step 5 specifically includes steps of:

Step 51: utilizing the charging and discharging power $p_j(t)$ of the electric vehicle within the period of time t, and calculating a power command value of the electric vehicle which participates in the charging and discharging $\gamma_j$ based on a power demand for the electric vehicle aggregator by the power system and dynamic charge status of the vehicle-mounted power battery:

$$\gamma_j = \frac{u_j SOC_j}{\sum_{j=1}^{N_v} u_j SOC_j} \gamma^{total}$$

in the above equation, $u_j$ is a power percentage value allowing working of the vehicle-mounted power battery of the electric vehicle, the percentage value is read via Step 1, $SOC_j$ is a charge state value of the power battery of the electric vehicle j and this value is read via Step 1; $\gamma$ is a total power demand for a charging access point of the electric vehicle j by the power system;

Step 52: setting an out-of-limit condition: a node active/reactive unbalance equation, $$\begin{cases} \Delta P_k = P_k - U_k \sum_{b=1}^{n} U_b(G_{kb}\cos\delta_{kb} + B_{kb}\sin\delta_{kb}) \\ \Delta Q_k = Q_k - U_k \sum_{b=1}^{n} U_b(G_{kb}\sin\delta_{kb} - B_{kb}\cos\delta_{kb}) \end{cases} \quad (3)$$

in the above equation (3), $\Delta P_k$ is active unbalance of a node k, $\Delta Q_k$ is reactive unbalance of the node k; $U_k$ a voltage amplitude of the node k, $U_b$ is a voltage amplitude of a node b, $G_{kb}$-j$B_{kb}$ is mutual admittance between nodes k and b; $\delta_{kb}$ is a phase-angle difference between nodes k and b; $P_k$ is an injection active power of the node k and $Q_k$ is an injection reactive power of the node k, and they are specifically:

$$\begin{cases} P_k = P_{G,k} - P_{d,k} + N_{dc,k}P_{dc} - N_{c,k}P_c \\ Q_k = Q_{G,k} - Q_{d,k} \end{cases} \quad (4)$$

in the above equation (4), $N_{c,k}$ is a number of a charged electric vehicle at a node k, $N_{dc,k}$ is a number of a discharged electric vehicle at the node k; $P_{d,k}$ is an active load at the node k, $Q_{d,k}$ is a reactive load at the node k; $P_{G,k}$ is an active component of generated power at the node k, $Q_{G,k}$ is a reactive component of generated power at the node k, $P_c$ is an average charging power of the electric vehicle at the node k, and $P_{dc}$ is an average discharging power of the electric vehicle at the node k;

Step 53: judging whether a total charging and discharging power need $\gamma^{total\ need}$ at the node k in Step 51 violates active/reactive unbalance limits based on the above out-of-limit condition; if it violates unbalance limits, then there is a need to adjust the number of charged and discharged electric vehicles and the power thereof and to jump to Step 51 for recounting; and if it does not violate unbalance limits, there is a need to enter Step 54; and Step 54: setting the total charging and discharging power of the electric vehicle at each grid node obtained in Step 53 and charging and discharging power commands of the electric vehicle which participates in the charging and discharging service of the power system determined in Step 51 as final power command values.

* * * * *